April 28, 1953        G. J. MICHAELS        2,636,333
LAWN AND WEED MOWER
Filed Oct. 13, 1947        2 SHEETS—SHEET 1
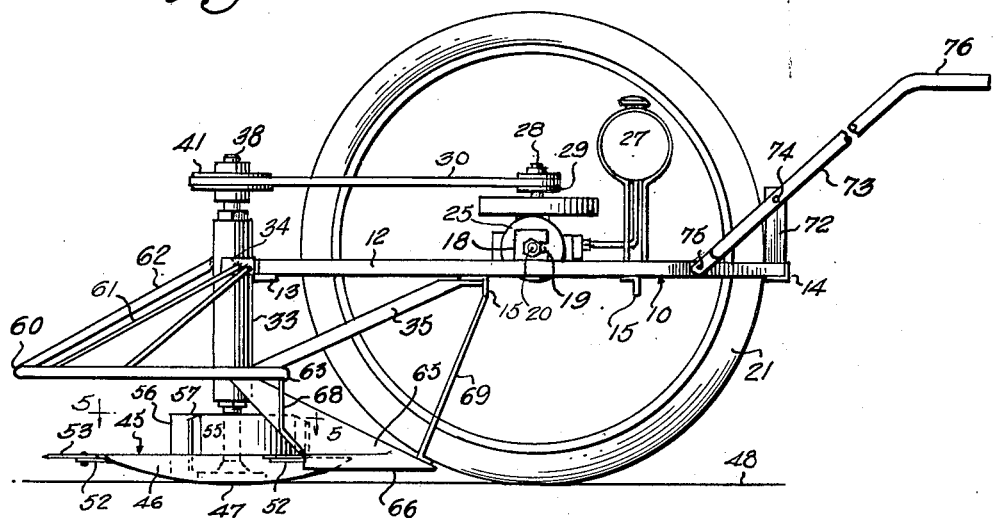
Inventor
GILBERT J. MICHAELS April 28, 1953    G. J. MICHAELS    2,636,333
LAWN AND WEED MOWER
Filed Oct. 13, 1947    2 SHEETS—SHEET 2
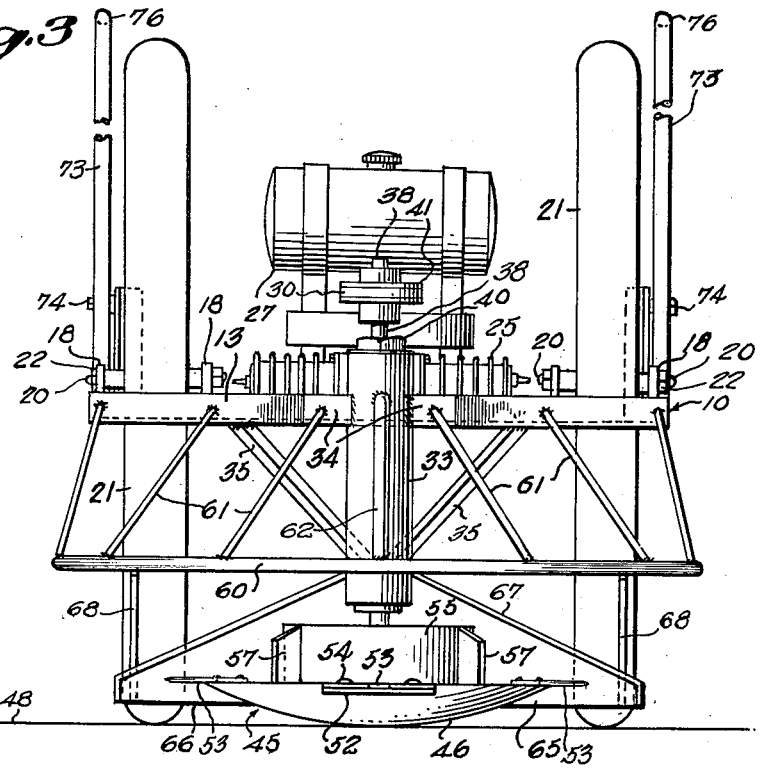
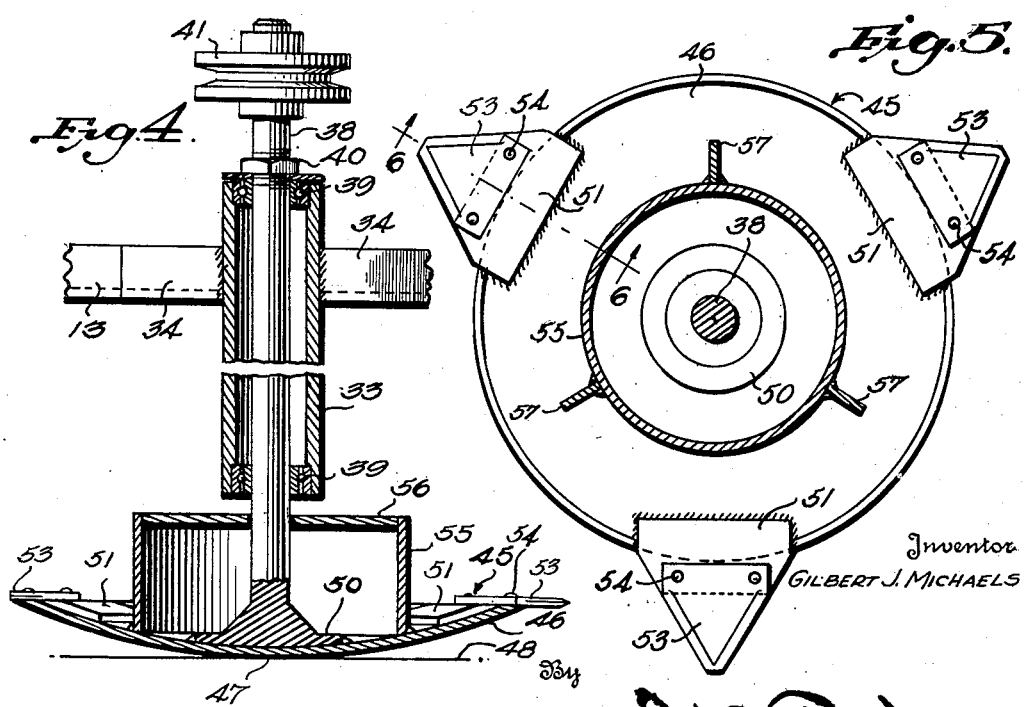
Inventor
GILBERT J. MICHAELS Patented Apr. 28, 1953

2,636,333

UNITED STATES PATENT OFFICE 2,636,333

LAWN AND WEED MOWER

Gilbert J. Michaels, Mattoon, Ill.

Application October 13, 1947, Serial No. 779,434

3 Claims. (Cl. 56—255)

This invention relates to power driven lawn mowers, and more particularly to a grass and weed mower of the type employing a cutting unit rotatable in a horizontal plane on a vertical axis.

An important object of the present invention is to provide a simplified and easily operable mower of the type referred to wherein the cutting unit serves to support the forward end of the apparatus and to predetermine the height of the cut above the ground.

A further object is to provide such an apparatus wherein the cutting unit supports the forward end of the apparatus relative to the ground substantially at a point coincident with the axis of rotation of the cutting unit, thereby eliminating the use of conventional supporting means and greatly reducing the friction of the movement of the parts over the ground.

A further object is to provide an apparatus of the character referred to wherein the cutting unit is provided with a blade-carrying body, the lower surface of which is formed as a section of a sphere adapted to contact with the ground substantially at a point coincident with the axis of rotation of the body and blades, such rotation at the point referred to preventing any tendency for the contact of the body with the ground to move the forward end of the apparatus transversely while at the same time substantially eliminating friction of the body with the ground which would substantially oppose forward manual pushing of the apparatus.

A further object is to provide novel means associated with and carried by the cutting unit for effectively throwing off grass and weeds to prevent the latter from winding around the driving spindle.

A further object is to provide a novel forward guard which serves the dual purpose of stopping the apparatus short of contact of the blades with trees, walls, etc., and of tilting tall grass and weeds forwardly prior to the cutting action to minimize the falling of the cut grass and weeds on the cutting unit.

A further object is to provide a novel rear guard which serves to prevent cut grass and weeds from flying upwardly into contact with the source of power and at the same time effectively protects the operator from injury if any of the rotary parts of the cutting unit should become broken and thrown outwardly from the axis of rotation by centrifugal force.

Other objects and advantages of the invention will become apparent during the course of the following description.

In the drawings I have shown one embodiment of the invention. In this showing:

Figure 1 is a side elevation of the apparatus with the rear wheel removed,

Figure 2 is a plan view of the same,

Figure 3 is a front elevation of the same somewhat enlarged,

Figure 4 is an enlarged fragmentary vertical sectional view taken substantially on line 4—4 of Figure 2, Figure 5 is an enlarged horizontal sectional view taken substantially on line 5—5 of Figure 1, and Figure 6 is an enlarged fragmentary vertical sectional view on line 6—6 of Figure 5.

Referring to the drawings, the numeral 10 designates the chassis of the apparatus as a whole comprising spaced inner and outer parallel longitudinal frame members 11 and 12 respectively, arranged at opposite sides of the apparatus. The forward ends of such frame members are connected by transverse members 13 extending entirely thereacross and a similar frame member 14 is connected across the rear ends of the longitudinal frame members. The frame members 11 are connected intermediate their ends by spaced transverse frame members 15 forming an engine support in a manner to be described. All of the frame members referred to may be made of angle section as shown and these members conveniently may be arc welded to rigidly connect them to each other.

The frame members 11 and 12 are provided with upstanding plates 18 welded thereto and provided in their upper ends with slots 19 receiving the axles 20 of supporting wheels 21. These wheels are preferably conventional front bicycle wheels and the axles are secured in position by nuts 22 threaded on the ends of the axles. The rear end of the frame members 11 and 12 are shortened up as much as possible, in which case opposite sides of the frame member 14 are cut away as at 23 to provide ample clearance for the wheels 21.

The frame members 15, as previously stated, form an engine mounting and any suitable engine 25 is bolted to the frame members 15 as at 26. In practice it is preferred that a 1½ horsepower engine 25 be employed equipped with the usual carburetor and ignition system which need not be particularly referred to. The engine is provided with a conventional fuel tank 27. The shaft 28 of the engine is provided with means for transmitting power to the cutting elements to be referred to, and this means is preferably in the form of a V-pulley 29 around which passes a V-belt 30, as shown in Figures 1 and 2.

A vertical cylindrical housing 33 is arranged against and preferably welded to the front transverse frame member 13. From the latter frame member, angle braces 34 extend to the housing 33 and these braces are preferably welded at their opposite ends to the frame member 13 and to the housing 33, thus effectively bracing the housing against turning movement on its axis. Upwardly and rearwardly diverging brace members 35 are welded at their forward ends to the housing 33 near the lower end thereof and at their rear ends to the forward engine supporting frame member 15. Accordingly it will be apparent that the housing 33 is effectively braced in proper position.

A rotary spindle 38 extends through the housing 33 and is mounted in suitable anti-friction bearings 39 in the opposite ends of the housing, the load represented by the spindle 38 and the elements carried thereby being supported by a nut 40 on the spindle 38. A V-pulley 41 is carried by the upper end of the spindle 38 and the V-belt 30 passes around this pulley, as shown.

The spindle 38 carries and drives a cutting unit indicated as a whole by the numeral 45. This unit comprises a dished body 46 formed as a section of a sphere, as clearly shown in Figure 4. It will be noted that the point of contact 47 of the lower surface of the body 46 with the surface 48 of the ground lies on the axis of rotation of the spindle 38. This is an important feature of the invention and will be further referred to below. The lower end of the spindle 38 is provided with a head 50 preferably welded to the body 46 whereby the latter is fixed to the spindle for rotation therewith. At equidistantly spaced points, the body 46 is provided with brackets 51 having their inner ends fitting and welded to the top surface of the body 46 and projecting radially outwardly therefrom in a horizontal plane as at 52. These projecting ends support cutting blades 53 bolted thereto as at 54, the blades thus being readily removable for sharpening or replacement.

Coaxially therewith, the body 46 carries a cylindrical shell 55 preferably closed at the top as at 56 and provided with radially outstanding fins 57. These fins rotate with the unit 45 and tend to throw outwardly by centrifugal force any grass which tends to accumulate on the body 46.

A substantially semi-circular guard 60 is arranged preferably coaxially with the spindle 38 and the cutting unit. It will be noted that this guard is of somewhat larger diameter than the circle defined by the outer edges of the cutting blades 53 to project radially outwardly therebeyond, as clearly shown in Figure 1. The guard 60 is also arranged a substantial distance above the cutting blades. This guard serves to prevent the apparatus from being moved forwardly to bring the blades 53 into contact with trees, walls, etc., and it also serves to contact with and bend forwardly any tall grass or weeds which extend upwardly into contact therewith. Such grass and weeds are cut while being bent forwardly and accordingly tend to fall clear of the cutting unit.

The guard 60 is supported by a plurality of brace members 61 connected between the guard and the frame member 13, and centrally of the width of the apparatus, a relatively heavy brace 62 is welded at its ends respectively to the guard 60 and to the sleeve 33. The guard 60 has a straight rear portion 63 extending across from end to end of the substantially semi-circular portion 60, thus effectively bracing such ends relative to each other.

A protective guard 65, preferably formed of sheet steel, extends downwardly over the rear portion of the cutting unit, and has its lower edge 66 arranged substantially in a horizontal plane beneath the plane of the blades 53. The guard 65 is transversely curved and has its edges converging forwardly as at 67 with the forward extremity of the guard cut to fit around and welded to the sleeve 33. Depending braces 68 are welded at their ends respectively to the guard 65 and to the rear guard bar 63. The rear center portion of the guard 65 is supported by means of a brace 69 welded at its ends respectively to the guard 65 and the frame member 15.

Upstanding post members 72, preferably of angle section, are welded at their lower ends to the guard 14 and to the inner faces of the vertical flanges of the frame members 12. A handle bar 73 is bolted as at 74 to each post 72 and continues downwardly and forwardly to be bolted as at 75 to the vertical flange of the associated frame member 12. The handle bars are shown broken away in Figure 1, but it will be understood that they extend upwardly to a convenient height and terminate in rearwardly extending hand grips 76. These hand grips may be conveniently arranged about 36 inches above the ground.

Operation

The engine 25 drives the spindle 38 through the V-belt 30 and pulleys 29 and 41, thus rotating the cutting unit. This unit is preferably carefully balanced to insure smooth vibration-free operation at 1200 to 1500 R. P. M. It will be noted that the center of gravity of the engine 25 is only slightly behind the vertical plane of the wheel axles 19, and the engine is so placed that the weight of the apparatus forwardly of the axles 19 is only slightly greater, preferably about 5 lbs., than the weight of the apparatus rearwardly of the axles 19. Thus the apparatus tends to remain in operative position with the body 46 contacting with the surface of the ground at the point 47, but for convenient transportation from place to place, the operator readily may depress the handles 76. This requires little force because of the near-balancing of the apparatus about the axis of the shafts 19, and thus the apparatus readily may be moved from place to place.

As stated, the body 46 normally contacts the ground at the single point 47 which lies on the axis of rotation of the spindle 38. Thus frictional contact with the ground is in a perfectly circular motion, and there is no tendency for the frictional engagement of the body 46 with the ground to cause the front end of the apparatus to move toward one side or the other. Thus with the exertion of substantially no lateral force on the handle 76, the apparatus may be easily guided in a straight line during the cutting operation. The blades 53, rapidly rotating about the axis of the spindle 38, perform the cutting operation, as will be obvious.

The cutting blades exert forces against the grass and weeds being cut tending to throw such material free of the body 46. Any tendency for the cutting material to accumulate on the top of such body, however, will cause the material to contact with the vertical fins or blades 57 to be thrown radially from the body 46. Thus the elements 57 tend to prevent any accumulation of grass and the winding of the grass about the spindle 38.

The guard 60 prevents the inadvertent moving of the blades 53 into engagement with hard stationary objects, such as trees, walls or posts, and accordingly the blades 53 are protected from injury. Moreover, the arrangement of the guard 60 is such that tall grass and weeds will be bent forwardly or radially outwardly relative to the axis of rotation of the cutting unit before the cutting action takes place. As such grass and weeds are cut, they tend to fall outwardly away from the cutting unit and the collection of the cut material on the body 46 is thus minimized.

The guard 65 prevents cut material from being thrown upwardly into the engine parts, thus preventing the accumulation of grass and weeds on the engine. Moreover, the guard 65 protects the operator from injury in the event any of the parts of the cutting unit, including the blades 53, should break and be thrown radially outwardly by centrifugal force.

It will be apparent that the smooth polished underside of the body 46 permits it to glide smoothly over the ground, and friction against forward movement is minimized by the rotation of the body 46. The vertical distance between the point 47 and the blades 53 determines the height of the cut being made, as will be obvious.

I claim:

1. A grass and weed mower comprising a substantially vertically disposed shaft, means mounting said shaft for rotation about its axis, a cutting unit carried by the lower end of said shaft and comprising a dished body having its lower face formed substantially as a section of a sphere, the lowermost point on said lower face being coincident with the axis of rotation of said shaft for supporting engagement with the ground, a plurality of cutting blades fixed to the edge portions of said body at circumferentially spaced points, a cylindrical member concentric with said shaft and fixed at its lower edge to said body, said member being of substantially smaller diameter than said body and having its top edge arranged substantially above said body, and a plurality of radially disposed fins secured to said member and rotatable therewith to prevent accumulation of weed and grass cuttings on said body.

2. Apparatus of the type set forth in claim 1 including a plurality of brackets fixed to the edge portions of said body at circumferentially spaced points, said cutting blades being fixed to said brackets and extending outwardly from said body.

3. Apparatus of the type set forth in claim 1 in which said cylindrical member comprises a shell having a top wall through which said shaft extends arranged substantially above said body, the fins secured to said member having their radially outer edges terminating radially inwardly of the outer limits of said body, said apparatus further including a tube surrounding said shaft of substantially smaller diameter than said shell, and bearing means in said tube for said shaft.

GILBERT J. MICHAELS.

References Cited in the file of this patent

UNITED STATES PATENTS

| Number | Name | Date |
|---|---|---|
| 453,634 | Geiger et al. | June 9, 1891 |
| 2,192,762 | Vincze | Mar. 5, 1940 |
| 2,225,139 | Urschel | Dec. 17, 1940 |
| 2,245,821 | Poynter | June 17, 1941 |
| 2,263,431 | White | Nov. 18, 1941 |
| 2,302,472 | Power | Nov. 17, 1942 |
| 2,329,185 | Coddington | Sept. 14, 1943 |
| 2,476,394 | Webb et al. | July 19, 1949 |
| 2,539,934 | Smith | Jan. 30, 1951 |
| 2,549,317 | Laughlin | Apr. 17, 1951 |

FOREIGN PATENTS

| Number | Country | Date |
|---|---|---|
| 416,140 | Great Britain | Sept. 13, 1943 |